United States Patent [19]

Farmer

[11] Patent Number: 4,700,258

[45] Date of Patent: Oct. 13, 1987

[54] LIGHTNING ARRESTER SYSTEM FOR UNDERGROUND LOOP DISTRIBUTION CIRCUIT

[75] Inventor: Donald J. Farmer, Pine Bluff, Ark.

[73] Assignee: Colt Industries Inc., New York, N.Y.

[21] Appl. No.: 887,355

[22] Filed: Jul. 21, 1986

[51] Int. Cl.[4] .............................................. H02H 7/04

[52] U.S. Cl. ...................................... 361/39; 361/117; 439/429

[58] Field of Search ....................... 361/35, 36, 38, 39, 361/117, 118, 119; 339/100

[56] References Cited

U.S. PATENT DOCUMENTS

| | | | |
|---|---|---|---|
| 3,141,923 | 7/1964 | Henschke et al. | 339/100 |
| 3,825,866 | 7/1974 | Piccione | 361/39 |
| 4,005,341 | 1/1977 | Uptegraff, Jr. et al. | 361/38 |
| 4,621,298 | 11/1986 | McMillen | 361/38 |

*Primary Examiner*—J. R. Scott
*Assistant Examiner*—Jeffrey A. Gaffin
*Attorney, Agent, or Firm*—Richard A. Dornon

[57] ABSTRACT

A lightening arrestor system (30) for a pad mounted distribution transformer (18') incorporated in an underground loop distribution circuit has a lighting arrester (32) secured to the transformer parking stand (P) and attached to the pad ground connection. The arrester has a well (38) into which a cable elbow (A) formerly mounted upon a primary terminal bushing (H1B) is inserted. The arrester includes a varistor assembly including metal oxide disks (58). An elbow arrester (24') is mounted upon the terminal bushing which formerly mounted the cable elbow. The arrester obviates the employment of a feed-through device (28).

7 Claims, 7 Drawing Figures

LIGHTNING ARRESTER SYSTEM FOR UNDERGROUND LOOP DISTRIBUTION CIRCUIT

TECHNICAL FIELD

This invention relates generally to lightning arresters and, more particularly to lightning arresters for use in pad mounted distribution transformers and switch gear apparatus.

BACKGROUND ART

In a typical residential underground loop distribution circuit system, it is usually considered desirable to break the loop near the center of the load. This is normally effectuated by parking one of the primary cable elbows in a standoff insulator mounted in the parking stand. While it is recognized that there are severe problems of underground cable failure in such systems due to lightning and reflected wave damage to the parked cable, particularly at higher voltages, most utilities presently employ no protection whatsoever and instead place reliance on the arrester at the riser pole.

Notwithstanding the general absence of underground cable protection, there now appears to be a strong predisposition toward applying arrestors at the open end of the loop to prevent the voltage wave from doubling as it reflects off the end of the line. The most common form of underground cable protection in use today is an arrangement employing two elbow arresters in a pad mounted transformer at the open point in the distribution loop. In this arrangement, one elbow arrester is installed on the bushing of a transformer left vacated by the removal of one of the primary cable elbows. The other elbow arrester is typically installed on a portable feedthrough device mounted in the parking stand between the primary bushings. The cable removed from the transformer is also installed on the feedthrough device, whereby protection is furnished to the disconnected cable.

DISCLOSURE OF INVENTION

In accordance with the invention, there is provided a metal oxide varistor lightning arrester/H.V. well device for use in pad mounted distribution devices such as transformers and switch gear apparatus. An arrester of the invention incorporates a high voltage bushing well which may embody an ANSI standard interface for a cable elbow, a bracket for attaching the arrester to a parking stand, a metal oxide varistor arrester disk assembly, and a ground lead.

In a lightning arrester system of the invention, the arrester is positioned in the parking stand with the disconnected primary cable mounted upon the arrester, thereby obviating a feedthrough device. Although utilization of a system of the invention will not completely replace elbow arrester usage (since an elbow arrester is the most effective means of providing protection to the line energizing the transformer installed on the open bushing), it will measurably reduce usage. It will thus be appreciated that the invention provides a simple and economical means of providing surge protection on the open end of an underground distribution loop at a distribution pad mounted transformer.

Accordingly, it is a primary object of the invention to provide a lightning arrester system on the open end of an underground distribution loop at a distribution pad mounted transformer.

Another object is to provide a lightning arrester adapted to have a disconnected primary cable installed directly thereupon.

These and other objects and advantages of the invention will become more readily apparent from the following detailed description when taken in conjunction with the accompanying drawings, in which:

BEST MODE OF CARRYING OUT THE INVENTION

Figure 1:
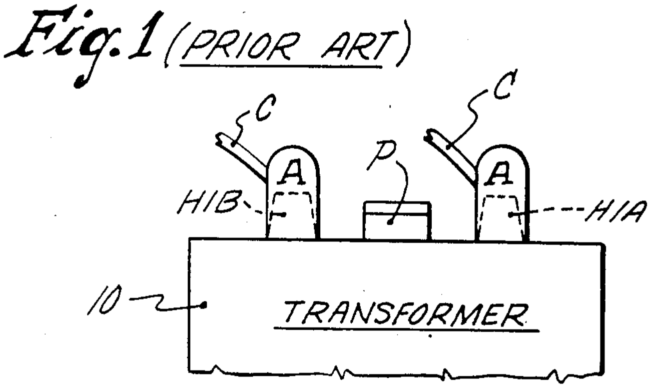
Fig. 1 (PRIOR ART)
FIG. 1 is a schematic representation of a distribution transformer having a hook-up with no arrestors.

Referring to FIG. 1, there is shown a conventional pad mounted distribution transformer 10 having two cable elbows A attached to the respective primary terminal bushings HlA and HlB. Throughout this description and the drawings, the letter A is used to designate a cable elbow and the notations H1A and H1B are used to respectively designate primary terminal bushings of a transformer. The transformer 10 is attached to what is commonly termed a parking stand P, which letter is also used throughout the description and drawings to indicate the parking stands of other transformers. In FIG. 1, it will be noted that a normal hook-up is depicted, i.e., a hook-up without arresters.

Figure 3:
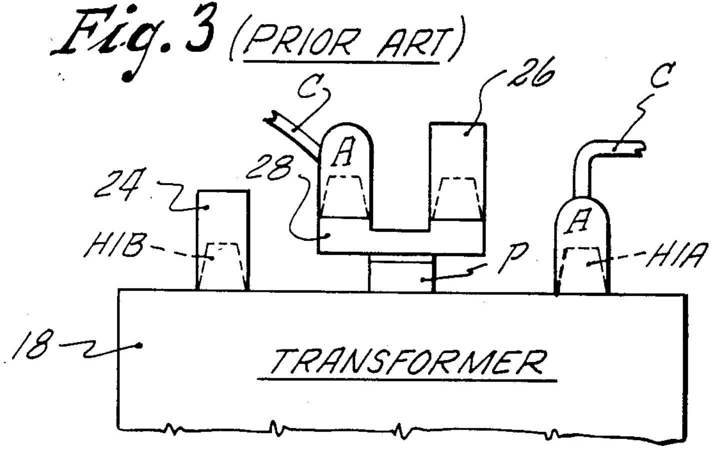
Fig. 3 (PRIOR ART)
FIG. 3 is a schematic representation of the distribution pad mounted transformer of FIG. 2 which embodies the feedthrough device.
Figure 2:
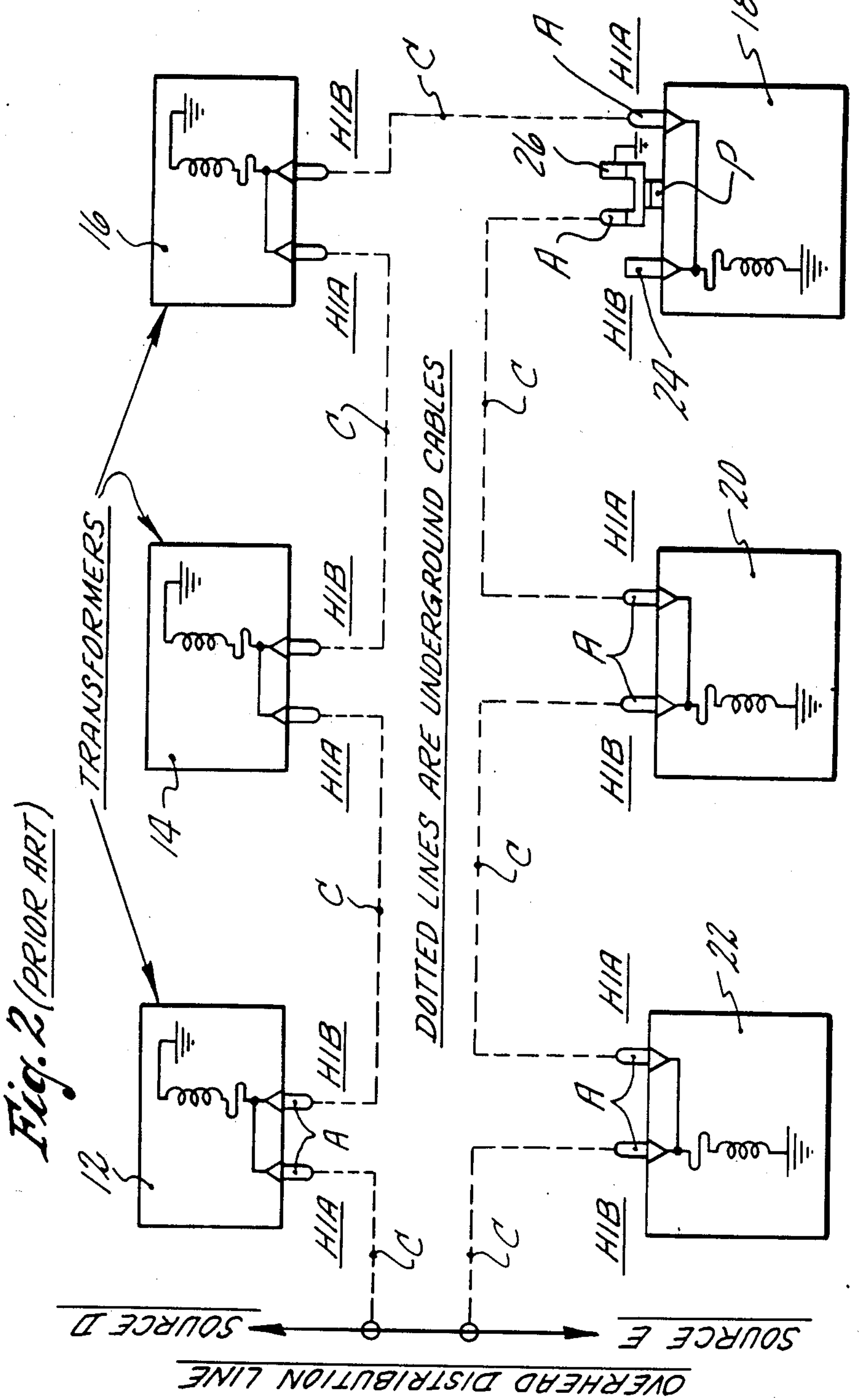
Fig. 2 (PRIOR ART)
FIG. 2 is a schematic representation of an underground distribution loop having a distribution pad mounted transformer with a feedthrough device.

In FIG. 2 there is illustrated a prior art residential underground loop power distribution circuit connected to an overhead distribution line having voltage sources D and E. Underground cables C, having aboveground segments attached to cable elbows, are shown in dotted lines interconnecting a plurality of pad mounted distribution transformers 12, 14, 16, 18, 20, and 22. As shown in FIG. 2, the loop distribution circuit has an open end adjacent the transformer 18. As best shown in FIG. 3, transformer 18 is provided with two conventional elbow arresters 24 and 26, with elbow arrestor 24 installed on the bushing HlB, which formerly held a primary cable elbow A. The other elbow arrester 26 is installed in a portable feedthrough device 28 which is mounted upon the parking stand P of transformer 18 between the primary terminals and connected to ground. The cable C removed from the terminal, which now serves to mount the arrester 24, is also installed on the feedthrough device to provide protection thereto.

Figure 4:
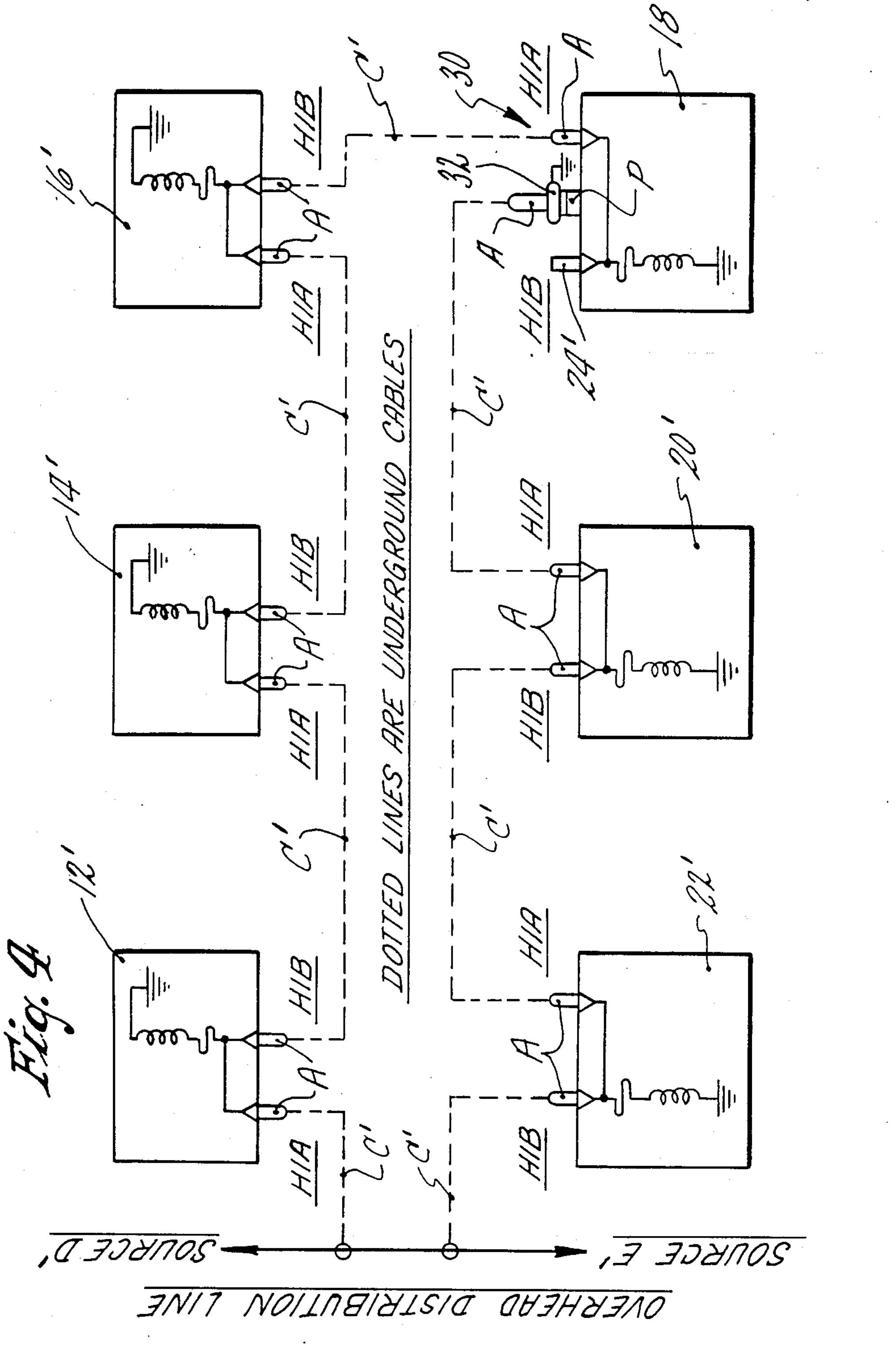
FIG. 4 is a schematic representation of an underground distribution loop having a distribution pad mounted transformer in accordance with the invention.

FIG. 4 shows a lightning arrester system of the invention wherein elements similar to those of FIG. 2 are designated by like primed numerals and letters. It will be seen that the system of FIG. 4 differs from the system of FIG. 2 only in the parking stand lightning arrester arrangement of the invention which is generally indicated at 30 in FIG. 4. With continued reference to FIG. 4, it will be appreciated that the lightning arrester arrangement has a ground connection as does the prior art arrangement of FIG. 2.

Figure 5:
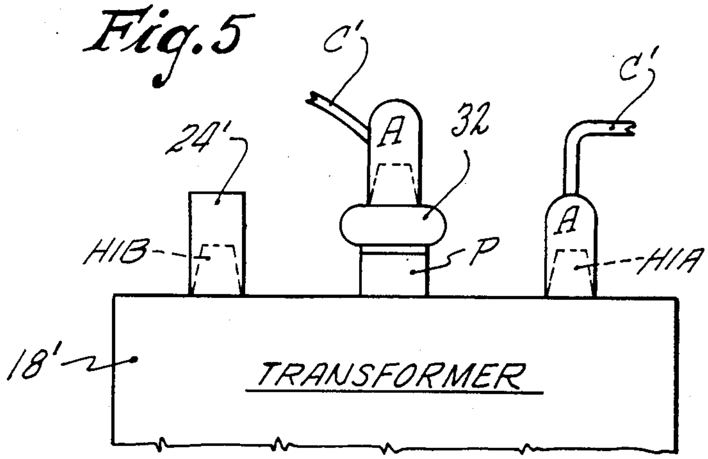
FIG. 5 is schematic representation of the pad mounted transformer of the invention shown in FIG. 4.

FIG. 5 shows the arrester arrangement of FIG. 4 and the nature of its association with the transformer 18' in greater detail. Fixedly attached to the parking stand P of the transformer 18' is a parking stand arrester of the invention generally shown at 32. The cable elbow A, which was formerly mounted upon terminal bushing H1B, is secured to the arrester 32, thereby providing a ground path for the cable C' formerly mounted upon terminal bushing H1B of transformer 20'. The terminal bushing H1B, from which the cable elbow A was removed, is furnished with an elbow arrester 24' in a fashion identical to that of the transformer 18 of FIG. 3. Hence, the system of FIG. 4 is devoid of a feedthrough device.

Figure 7:
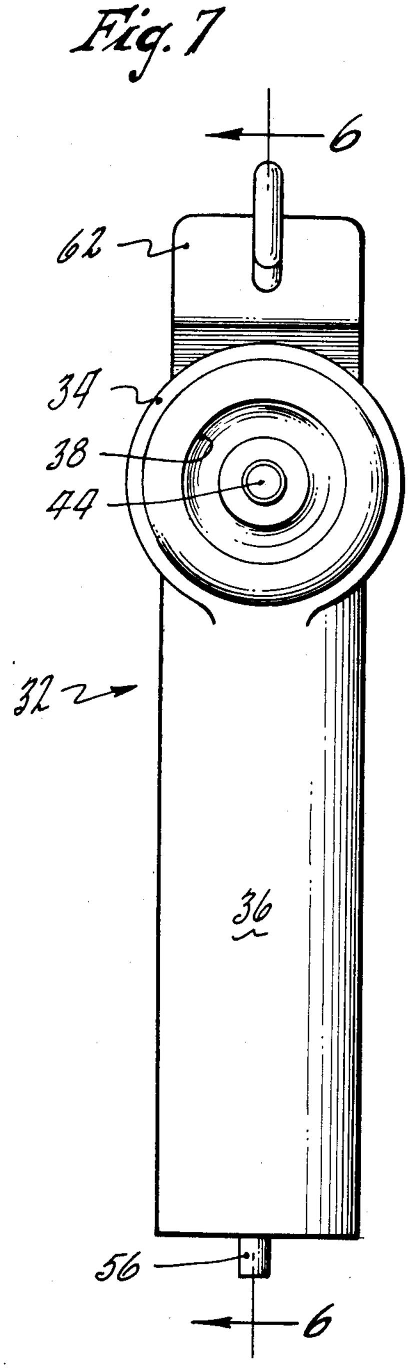
FIG. 7 is a front elevational view of an arrester of the invention, taken substantially along the line 7—7 of FIG. 6.
Figure 6:
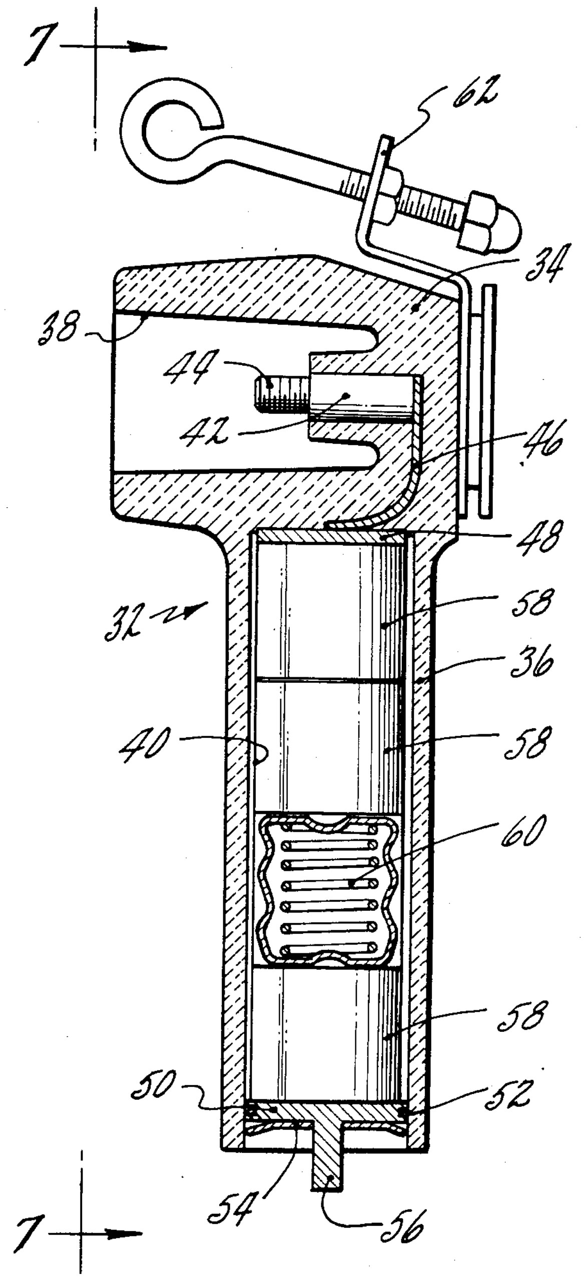
FIG. 6 is a sectional side elevational view of an arrester of the invention, taken substantially along the line 6—6 of FIG. 7.

A preferred construction for the metal oxide varistor arrester 32 is illustrated in FIGS. 6 and 7. Arrester 32 has a body of insulating thermoset or thermoplastic material which defines a head portion 34 and a cylindrical depending leg portion 36. The entire external surface of the insulating material is coated with a semi-conductive material which is grounded. The head portion 34 is formed with a well or cavity 38 and the leg portion 36 is formed with an elongated cylindrical cavity 40.

A metal plug 42, having a threaded segment 44 projecting from a raised area of the base of the cavity 38, is encapsulated in the head portion 34. The rear or right end of the plug 42 is secured to an L-shaped strip of metal 46 similarly embedded in the head portion 34. The lower leg of the metal strip 46 is exposed on the base of the cavity 40 and engages a cylindrical metal base plate 48 mounted in the base of the cavity 40. Hence, a conductive path is established between the plug 42 and the base plate 48.

Adjacent the mouth of the cavity 40, a metal disk 50, with a diameter just slightly less than that of the cylindrical cavity 40, is positioned. The metal disk is provided with an O-ring seal 52 to ensure that the gas (i.e., the air) within the cavity 40 remains inert. The disk 50 is maintained in position by an abutting external tooth retainer 54. Depending from the disk 50 is a threaded stud 56 which is attached to the system ground pad.

Between the base plate 48 and the disk 50, a plurality of metal oxide disk varistors 58 are inserted. The varistors 58 are maintained in firm contact with each other, the base plate 48 and the disk 50 by a compression spring 60 interposed between two adjacent varistors. In addition, a shunt (not shown) in the form of a metal strip interconnects the varistors 58 adjacent the spring to prevent possible damage thereto.

In order to install the arrester of FIGS. 6 and 7 on a parking stand, a bracket 62 is fixedly mounted upon the arrestor body on the right side of the head portion 34 thereof. An insert (not shown), having a ANSI standard interface adapted to match and receive a cable elbow, is lubricated and screwed onto the threaded segment 44 of the plug 42 to allow the cable elbow A removed from the terminal bushing H1B to be inserted thereupon and hence plugged into the well 38.

It will thus be appreciated that installation of an arrester of the invention in a system of the invention may be effected in a facile manner. After locking the arrester 32 in position on the parking stand P, installation is completed by simply removing the cable elbow A from the bushing H1B and plugging it into the well 38.

Obviously, many variations and modifications are possible in light of the above teachings without departing from the scope or spirit of the invention as defined in the appended claims.

I claim:

1. In an improved power distribution circuit system of the type having: a pad having a ground connection; a distribution device mounted on the pad, the distribution device having two terminal bushings for receiving respective cable elbows; a parking stand attached to the distribution device; and an elbow arrester mounted upon one of the terminal bushings, the improvement comprising a lightening arrestor system having:

a body of insulating material having a well formed therein;

a bracket mounted upon the body of insulating material and secured to the parking stand for mounting the body of insulating material upon the parking stand;

means for securing a cable elbow within the well;

a varistor assembly mounted in the body;

means for providing an electrical connection between the securing means and the varistor assembly;

and means for providing a conductive path between the varistor assembly and the ground connection.

2. The improvement of claim 1 wherein the body of insulating material has a head portion and a leg portion with the well being located in the head portion and wherein the leg portion includes an elongated cavity and wherein the varistor assembly is mounted in the cavity.

3. The improvement of claim 2, wherein the securing means comprises:

a plug encapsulated in the head portion and having a threaded segment projecting into the well, the threaded segment being adapted to receive an interface configured to match and receive a cable elbow.

4. The improvement of claim 3, wherein the electrical connection providing means comprises:

an L-shaped strip of metal imbedded in the head portion.

5. The improvement of claim 3, wherein the conductive path providing means comprises:

a metal disk mounted in the cavity in connection with the varistor assembly; and a stud depending from the metal disk and attached to the ground connection.

6. The improvement of claim 5, wherein the varistor assembly comprises:

a plurality of stacked metal oxide varistor disks; and spring means to urge the varistor disks into firm engagement with each other, the L-shaped strip of metal and the metal disk.

7. The improvement of claim 1, wherein the distribution device is a distribution transformer.

* * * * *